US008701099B2

(12) United States Patent
Bikshandi et al.

(10) Patent No.: US 8,701,099 B2
(45) Date of Patent: Apr. 15, 2014

(54) ACCELERATING GENERIC LOOP ITERATORS USING SPECULATIVE EXECUTION

(75) Inventors: Ganesh Bikshandi, Bangalore (IN); Dibyendu Das, Bangalore (IN); Smruti Ranjan Sarangi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 12/938,312

(22) Filed: Nov. 2, 2010

(65) Prior Publication Data

US 2012/0110302 A1    May 3, 2012

(51) Int. Cl.
*G06F 9/45* (2006.01)
(52) U.S. Cl.
USPC ............................ 717/160; 717/149; 717/161
(58) Field of Classification Search
USPC ................................. 717/160–161, 147–151
See application file for complete search history.

(56) References Cited

U.S. PATENT DOCUMENTS

| | | | | |
|---|---|---|---|---|
| 5,121,498 A * | 6/1992 | Gilbert et al. | ................. | 717/149 |
| 5,657,485 A * | 8/1997 | Streitenberger et al. | ....... | 712/245 |
| 5,852,734 A * | 12/1998 | Komatsu et al. | .............. | 717/156 |
| 6,539,541 B1 * | 3/2003 | Geva | .............. | 717/150 |
| 6,708,331 B1 * | 3/2004 | Schwartz | ...................... | 717/160 |
| 6,948,160 B2 * | 9/2005 | Click et al. | .................... | 717/148 |
| 6,970,985 B2 * | 11/2005 | Moritz | ........................ | 711/154 |
| 7,493,607 B2 * | 2/2009 | Moritz | ........................ | 717/151 |
| 7,650,485 B1 | 1/2010 | Chou | | |
| 7,657,877 B2 * | 2/2010 | Vorbach et al. | ............... | 717/141 |
| 7,757,222 B2 * | 7/2010 | Liao et al. | .................... | 717/140 |
| 8,037,462 B2 * | 10/2011 | Archambault et al. | ....... | 717/149 |
| 8,087,010 B2 * | 12/2011 | Eichenberger et al. | ....... | 717/150 |
| 8,087,011 B2 * | 12/2011 | Eichenberger et al. | ....... | 717/151 |
| 8,104,030 B2 * | 1/2012 | Silvera et al. | ................. | 717/160 |
| 8,108,845 B2 * | 1/2012 | Little et al. | .................... | 717/149 |
| 8,151,255 B2 * | 4/2012 | Gustafson et al. | ............ | 717/160 |
| 8,276,131 B2 * | 9/2012 | Langman et al. | ............. | 717/148 |
| 8,327,344 B2 * | 12/2012 | Gschwind | ...................... | 717/160 |
| 8,468,508 B2 * | 6/2013 | Eichenberger et al. | ....... | 717/149 |
| 8,473,934 B2 * | 6/2013 | Brockmeyer et al. | ......... | 717/149 |
| 8,578,358 B2 * | 11/2013 | Gonion | ........................ | 717/160 |

OTHER PUBLICATIONS

Schultz et al, "Automatic Program Specialization for Java", ACM Transactions on Programming Languages and Systems, vol. 25, No. 4, pp. 452-499, 2003.*

Kulkarni et al, "Optimistic Parallelism Requires Abstractions ", ACM, pp. 211-222, 2007.*

(Continued)

*Primary Examiner* — Anil Khatri
(74) *Attorney, Agent, or Firm* — Yudell Isidore Ng Russell PLLC (57) ABSTRACT

A method, a system and a computer program product for effectively accelerating loop iterators using speculative execution of iterators. An Efficient Loop Iterator (ELI) utility detects initiation of a target program and initiates/spawns a speculative iterator thread at the start of the basic code block ahead of the code block that initiates a nested loop. The ELI utility assigns the iterator thread to a dedicated processor in a multi-processor system. The speculative thread runs/executes ahead of the execution of the nested loop and calculates indices in a corresponding multidimensional array. The iterator thread adds all the precomputed indices to a single queue. As a result, the ELI utility effectively enables a multidimensional loop to be replaced by a single dimensional loop. At the beginning of (or during) each iteration of the iterator, the ELI utility "dequeues" an entry from the queue to use the entry to access the array upon which the ELI utility iterates. The ELI utility performs concurrent iterations on the array by using the queue entries.

15 Claims, 5 Drawing Sheets

(56) References Cited

OTHER PUBLICATIONS

Thompson et al, "Partially Ordered Epochs for Thread-Level Speculation", ACM, pp. 299-306, 2005.*

Hawkins et al, "Concurrent Data Representation Synthesis" ACM, pp. 417-427, 2012.*

Milind Kulkarni; "The Galois System: Optimistic Parallelization of Irregular Programs"; Theses and Dissertations, Cornell University Library, Jul. 2008; Cornell University Graduate School.

Milind Kulkarni et al.; "Scheduling Strategies for Optimistic Parallel Execution of Irregular Programs"; Proceedings of the Twentieth Annual Symposium on Parallelism in Algorithms and Architectures, 2008; ACM.

Gerhard Zumbusch; "A Container-Iterator Parallel Programming Model"; Proceedings of the 7th International Conference on Parallel Processing and Applied Mathematics, 2007; Springer-Verlag.

* cited by examiner

ACCELERATING GENERIC LOOP ITERATORS USING SPECULATIVE EXECUTION

BACKGROUND

1. Technical Field

The present invention generally relates to computer-implemented data processes and in particular to computer-implemented array traversal systems. Still more particularly, embodiments of the present invention relate to computer-implemented methods for traversing multi-dimensional arrays.

2. Description of the Related Art

Conventional array traversal mechanisms have multiple "for" loops, one per dimension. When these loops are present, a program requires additional branch instructions. Thus, as a result of these added branch instructions, these conventional array traversal mechanisms represent an inefficient way of traversing arrays. Furthermore, branch instructions introduce performance penalties because of the difficulty of predicting and handling branches at the architectural level. These inefficiencies become even more critical when traversing complex multi-dimensional arrays.

BRIEF SUMMARY

Disclosed are a method, a system and a computer program product for effectively accelerating loop iterators using speculative execution of iterators. An Efficient Loop Iterator (ELI) utility detects initiation of a target program and initiates/spawns a speculative iterator thread at the start of the basic code block ahead of the code block that initiates a nested loop. The ELI utility assigns the iterator thread to a dedicated processor in a multi-processor system. The speculative thread runs/executes ahead of the execution of the nested loop and calculates indices in a corresponding multidimensional array. The iterator thread adds all the pre-computed indices to a single queue. As a result, the ELI utility effectively enables a multidimensional loop to be replaced by a single dimensional loop. At the beginning of (or during) each iteration of the iterator, the ELI utility "dequeues" an entry from the queue to use the entry to access the array upon which the ELI utility iterates. The ELI utility performs concurrent iterations on the array by using the queue entries.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, a system and a computer program product for effectively accelerating loop iterators using speculative execution of iterators. An Efficient Loop Iterator (ELI) utility detects initiation of a target program and initiates/spawns a speculative iterator thread at the start of the basic code block ahead of the code block that initiates a nested loop. The ELI utility assigns the iterator thread to a dedicated processor in a multi-processor system. The speculative thread runs/executes ahead of the execution of the nested loop and calculates indices in a corresponding multidimensional array. The iterator thread adds all the precomputed indices to a single queue. As a result, the ELI utility effectively enables a multidimensional loop to be replaced by a single dimensional loop. At the beginning of (or during) each iteration of the iterator, the ELI utility "dequeues" an entry from the queue to use the entry to access the array upon which the ELI utility iterates. The ELI utility performs concurrent iterations on the array by using the queue entries.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
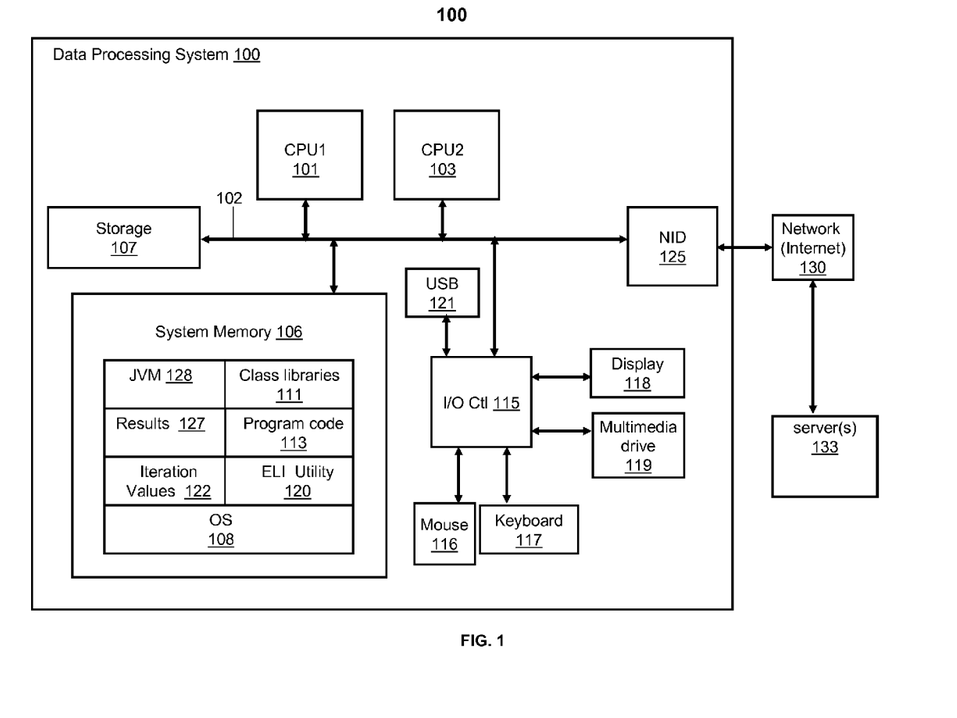
FIG. 1 provides a block diagram representation of an example data processing system within which the embodiments are practiced.

With reference now to the figures, and beginning with FIG. 1, there is depicted a block diagram representation of an example data processing system (DPS), as utilized within one embodiment. DPS may be a server, a personal computer, a portable device, such as a personal digital assistant (PDA), a smart phone, and/or other types of electronic devices that may generally be considered processing devices. As illustrated, DPS 100 comprises multiple processors including central processing unit (CPU) 101 and CPU 103 which are both connected to system memory 106 (which, for simplicity, is illustrated as a single memory component) via system interconnect/bus 102. Also connected to system bus 102 is input/ output (I/O) controller 115, which provides connectivity and control for input devices, of which pointing device (or mouse) 116 and keyboard 117 are illustrated. I/O controller 115 also provides connectivity and control for output devices, of which display 118 is illustrated. Additionally, a multimedia drive 119 (e.g., compact disk read/write (CDRW) or digital video disk (DVD) drive) and USB (universal serial bus) port 121 are illustrated, coupled to I/O controller 115. Multimedia drive 119 and USB port 121 enable insertion of a removable storage device (e.g., optical disk or "thumb" drive) on which data/instructions/code may be stored and/or from which data/instructions/code may be retrieved. DPS 100 also comprises storage 107, within/from which data/instructions/code may also be stored/retrieved.

To further enable external network connection, DPS 100 also includes network interface component (NIC) 125, by which DPS 100 may connect to one or more access/external networks 130, of which the Internet is provided as one example. In this implementation, the Internet represents/is a worldwide collection of networks and gateways that utilize the Transmission Control Protocol/Internet Protocol (TCP/IP) suite of protocols to communicate with one another. NIC 125 may be configured to operate via wired or wireless connection to an access point of the network. Network 130 may be an external network such as the Internet or wide area network (WAN), or an internal network such as an Ethernet (local area network—LAN) or a Virtual Private Network (VPN). Connection to the external network 130 may be established with one or more servers 135, which may also provide data/instructions/code for execution on DPS 100, in one embodiment.

In addition to the above described hardware components of wireless system 100, various features of the invention are completed/supported via software (or firmware) code or logic stored within memory 106 or other storage and executed by Processor 101. Thus, for example, illustrated within memory 106 are a number of software/firmware/logic components, including Java Virtual Machine 128, class libraries 111, speculative results 127, iteration values 122 and program code 113. Although components of and/or associated with a Java development environment/platform are shown, other development platforms may be utilized. In addition, memory 106 comprises Efficient Loop Iterator (ELI) logic/utility 120. In actual implementation, ELI logic 120 may be combined with another application 114 to provide a single executable component, collectively providing the various functions of each individual component when the corresponding combined component is activated. For simplicity, ELI logic 120 is illustrated and described as a stand alone or separate logic/firmware component, which provides specific functions, as described below.

In one embodiment, server 133 represents a software deploying server, and DPS 100 communicates with the software deploying server (133) via network (e.g., Internet 130) using network interface device 125. Then, ELI utility 120 may be deployed from/on the network, via software deploying server 133. With this configuration, software deploying server can perform some or all of the functions associated with the execution of ELI utility 120. Accordingly, DPS 100 may not be required to utilize internal computing resources of DPS 100 to execute ELI utility 120.

Certain of the functions supported and/or provided by ELI utility/logic 120 are implemented as processing logic (or code) executed by processor 101 and/or other device hardware, which processing logic completes the implementation of those function(s). Among the software code/instructions/logic provided by ELI logic 120, and which are specific to the invention, are: (a) logic for pre-assigning a speculative iterator thread to a dedicated processor in the multiple processor system; (b) logic for initiating/spawning the speculative iterator thread ahead of the execution of a nested loop; (c) logic for using the speculative thread to pre-compute indices in/for a corresponding multidimensional array; (d) logic for adding all the pre-computed indices to a single queue; (e) logic for "dequeueing" an entry from the queue to use the entry to access the array upon which iteration is performed, at each iteration; and (f) logic for (concurrently) executing iterations by using respective iteration values/entries. According to the illustrative embodiment, when CPU 101 executes ELI logic 120, DPS 100 initiates a series of functional processes that enable the above functional features as well as additional features/functionality. These features/functionalities are described in greater detail below within the description of FIGS. 2-5.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
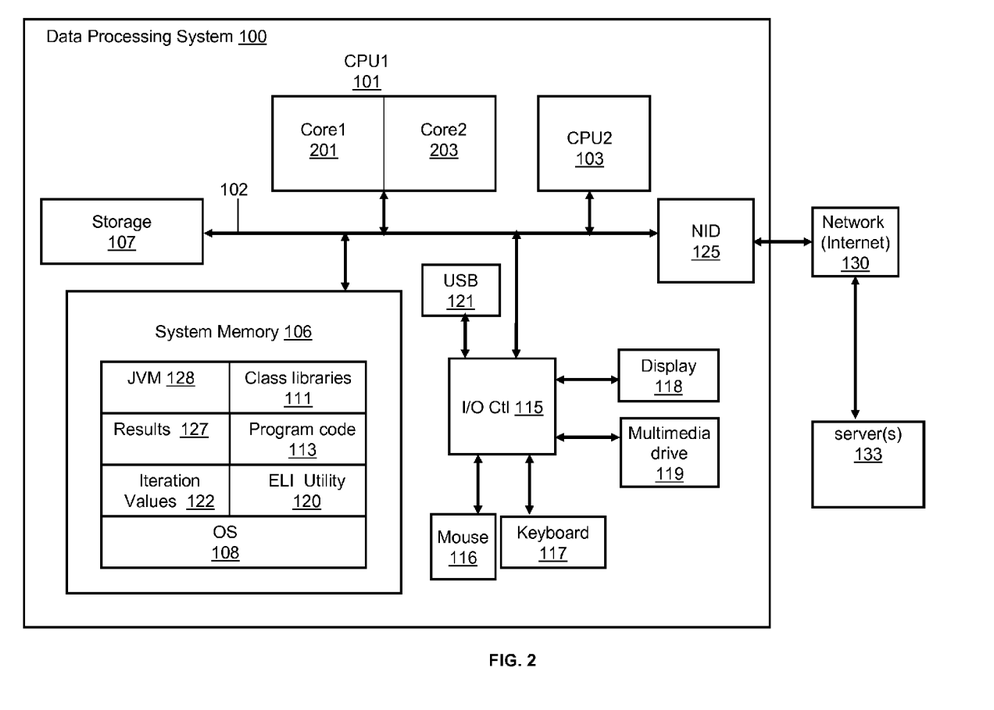
FIG. 2 illustrates an example multi-core data processing system, in accordance with one embodiment.

FIG. 2 illustrates an example multi-core data processing system, in accordance with one embodiment. DPS 100 comprises a group of processors (including CPU1 101 and CPU2 103) Within CPU1 101 are two processor cores, illustrated as core1 201 and core2 203. DPS 100 as illustrated in FIG. 2 clearly illustrates a multiple processor and multi-core processor system which provides the capacity for multiple iterations of program code/methods to execute concurrently on separate processors and/or processor cores during the speculative execution of program loop iterations.

Efficient Loop Iterator (ELI) utility 120 executing on CPU 101 traverses arrays by using a speculative thread to pre-compute the array indices. Furthermore, ELI utility 120 makes effective use of multi-threaded hardware to speed up single threaded programs. The speculative thread is spawned at the start of the basic block of program code preceding the code that starts a nested loop. The speculative thread runs ahead and calculates indices in the multidimensional array. The thread adds all these pre-computed indices to a (single) queue. Because there is a single enqueuer and single dequeuer, there is no requirement to protect the queue with locks. A programmer is thus able to replace a multidimensional loop and instead utilize a single dimensional loop. At each iteration, ELI utility 120 "dequeues" an entry from the queue and uses the entry to access the array upon which the speculative thread iterates.

ELI utility 120 performs array traversal by using co-routines to perform iterations over a region in a speculative manner. The ELI utility 120 defines a region as shown below. For example, the region is a Struct (i.e., defined using the "Struct" keyword).

```
Struct
{
int lo[MAX_DIM]; //line 3
int hi[MAX_DIM]; //line 4
int stride[MAX_DIM]; //line 5
};
```

The variable "lo" (from line 3) defines the lower bounds of the region, variable "hi" (from line 4) is the upper bound and "stride" (from line 5) is the successive steps along each dimension to span the region. For example, lo={0,0}, hi={1,1} and stride={1,1} denotes a rectangular region in the range [0:1, 0:1] with stride being one in all dimensions. In this case, successive coordinates in the region are incremented by one along all the dimensions to span the region. MAX_DIM defines the maximum dimension allowed for a region as a constant value. For example, MAX_DIM may be defined as 3.

Additionally, ELI utility 120 defines an iterator class. The iterator class uses co-routines for iterating through points in the defined region. A first method (e.g., "first( )") returns a first point in the iteration. Subsequently, ELI utility 120 allows calls to a second method (e.g., "next( )") for other points. The next( ) method uses "for" loops of a preset fixed maximum (e.g., "MAX_DIM") depth of nesting. Every time next( ) is called, a "goto" statement in the beginning of the next( ) method transfers the control to the last statement of the inner-most loop. This transfer of control results in the execution of the next iteration of the loop nest (within the next( ) method). After the next iteration is executed, a point is returned. The point is the coordinate which is currently accessed by the iterator class. Thus, in the next( ) method only one iteration is executed. When all the iterations are completed, execution via the next( ) method is completed.

In one embodiment, ELI utility 120 may utilize the iterator class to define an iteration operation over a two-dimensional region. An example is provided as follows:

```
void sum (double* a, region r) {
iter it(r);
double sum = 0.0;
for (int* pt = it.first( );it.hasNext( ); pt=it.next( )){
sum += a[INDX(pt[0],pt[1])];
}
}
```

The region "r" in the function "sum" may be of any dimension (e.g., one, two, three, etc). The iteration operation iterates over all the points defined in "r" and obtains the co-ordinates in the current iteration cycle. The coordinates are returned in an int* array. Thereafter, the obtained coordinates are appropriately indexed. For example, the coordinates may be indexed via a user defined macro "INDX".

In one embodiment, ELI utility 120 also performs the iteration over non-rectangular regions (e.g., triangular regions). For example, ELI utility 120 may enable/perform this particular type of region iteration that enables iteration through a triangular region. Further, a different representation (i.e., different from the previously defined Struct) for triangular region is also required in this case. In another embodiment, ELI utility 120 utilizes C++ templates to improve performance by customizing next( ) for different dimensions which avoids loop overheads when the actual dimension is less than the defined MAX_DIM.

ELI utility 120 speculatively executes the iterator in a dedicated processor of a system consisting of a plurality of processors. In one or more embodiments, ELI utility 120 utilizes/comprises the following: (a) a dedicated (iterator) thread assigned to a dedicated CPU; (b) a circular ring buffer shared by all the CPUs (Q); (c) a proxy iterator object (called "delegate") ; (d) a global variable to store the delegate; and (e) a boolean flag to awaken the iterator thread. ELI utility 120 spawns the iterator thread at the beginning of the program and assigns the thread to a dedicated CPU. The iterator thread simply loops checking the value of the flag (that awakens the iterator thread) for a value of true. In one embodiment, the iterator thread via the flag is awakened when an empty slot in the queue is identified. If the thread succeeds (i.e., if flag is "true"), then the iterator thread reads the delegate object and starts executing a method (e.g., "append( )") used for generating iteration indices/values. The append( ) method simply generates the value for each iteration and stores that value in Q. To avoid overrun of heap, Q is bounded to a pre-determined size (Q_SIZE). If Q becomes full, the iterator thread stops the queuing process and busy loops checking for at least one empty slot in the queue. If there is an empty slot the iterator thread inserts the current tuple.

ELI utility 120 "accelerates" a given iterator using speculative execution. With the current advances in hardware technology, computer cores/elements are becoming increasingly abundantly. ELI utility 120 efficiently executes the iterator ahead of the actual target program execution period (using the abundant resources) and uses or throws the results, based on the program execution path.

Figure 3:
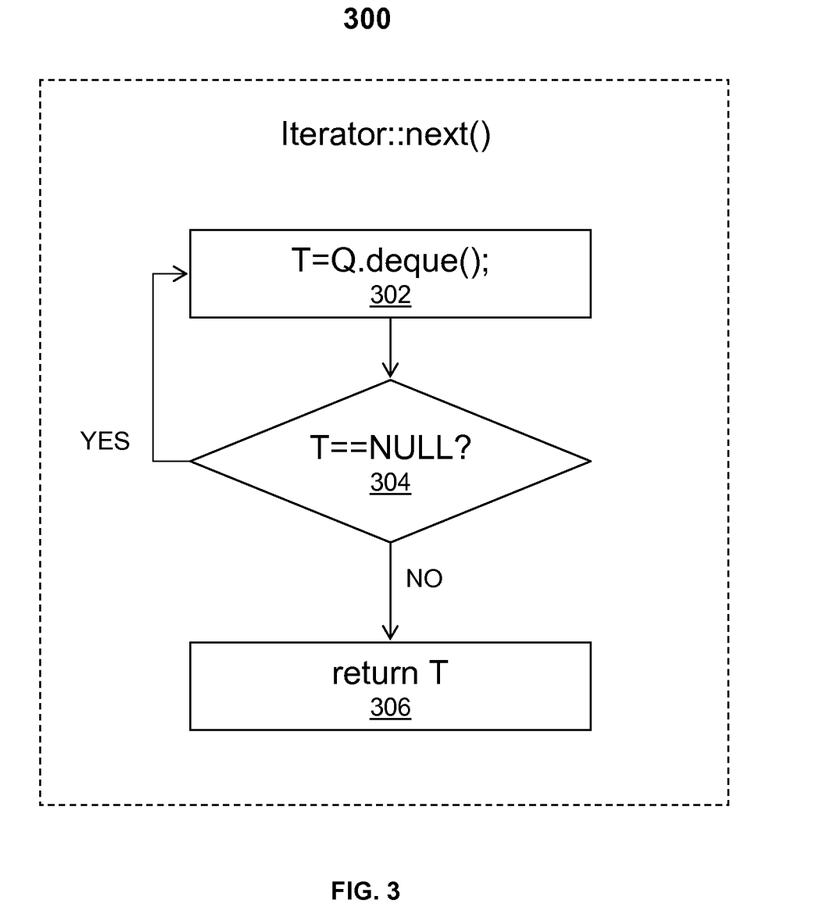
FIG. 3 illustrates execution steps via a "next" method following spawning of an iterator thread, in accordance with one embodiment.

FIG. 3 illustrates execution steps via a "next" method following spawning of an iterator thread, in accordance with one embodiment. Process "next" 300 shows the use of a boolean flag to "awaken" the iterator thread. ELI utility 120 spawns the iterator thread at the beginning of the target program and assigns the thread to a dedicated CPU. At block 302, the iterator thread reads a value in the queue "Q" in order to find an empty slot. The flag indicates that an empty slot is located. The iterator thread simply loops checking the value of the flag for a value of "TRUE" (at process block 304). If the thread succeeds (i.e., when T=NULL meaning the flag is "TRUE" or not "FALSE"), then the iterator thread reads the delegate object and begins executing the append( ) method. If the flag is FALSE (i.e., an empty slot is not yet located), the iterator thread returns the value obtained from reading the current slot in the queue (at process block 306).

Figure 4:
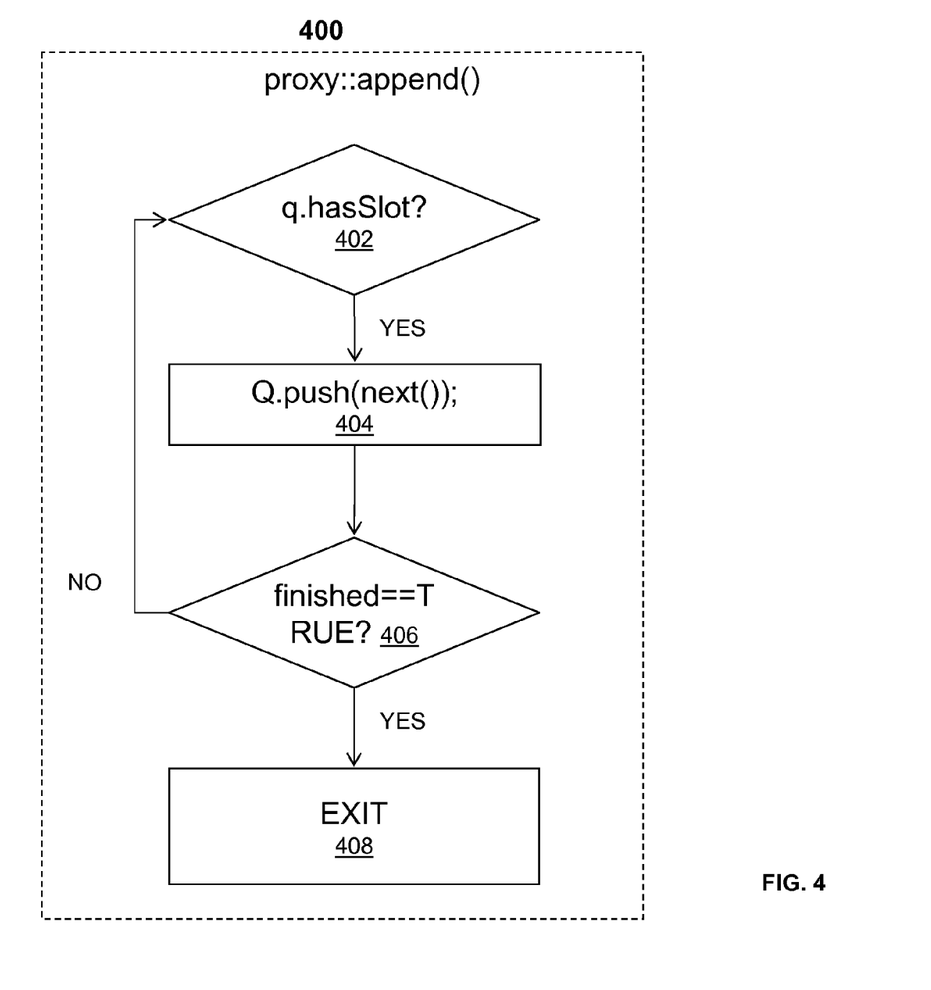
FIG. 4 illustrates the execution steps of the "append" method which method is used to generate the values for each iteration.

FIG. 4 illustrates the execution steps of the "append" method, which is used to generate the values for each iteration, in accordance with one embodiment. As illustrated via process "append" 400, if space is available in the queue (as is determined at block 402), the append( ) method simply generates the value for each iteration and stores that value in Q, as shown at block 404. To avoid overrun of the heap, Q is bounded to a pre-determined size (Q_SIZE). If Q becomes full, the iterator thread stops the queuing process and busy loops to check for at least one empty slot in the queue. If there is an empty slot, the iterator thread inserts the current tuple. At block 406 ELI utility 120 determines whether values for all iterations are obtained. If all values are obtained, the append( ) method is "exited" as shown at EXIT block 408.

Figure 5:
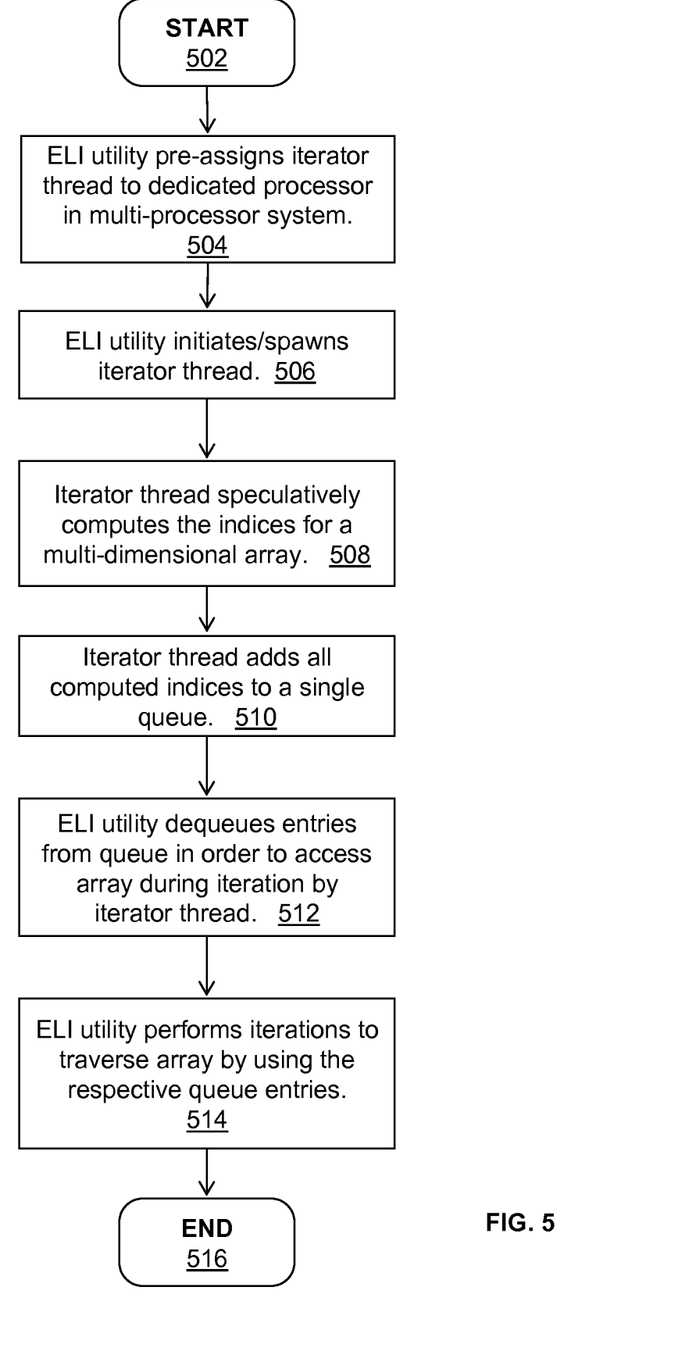
FIG. 5 is a flow chart illustrating the processes within the method for traversing multi-dimensional arrays by accelerating generic loop iterators using speculative execution, according to one embodiment.

FIG. 5 is a flow chart illustrating the process of for traversing multi-dimensional arrays by accelerating generic loop iterators using speculative execution, according to one embodiment. The process of FIG. 5 begins at initiator block 502 and proceeds to block 504, at which ELI utility 120 pre-assigns the iterator thread to a dedicated processor in the multi-processor system. At block 506, ELI utility 120 initiates/spawns an iterator thread. In particular, ELI utility 120 initiates execution of a speculative iterator thread ahead of the execution of the nested loop. At block 508, the speculative thread pre-computes indices for a corresponding multidimensional array. At block 510, the iterator thread adds all the pre-computed indices to a single queue. As a result, ELI utility 120 effectively enables a multidimensional loop to be replaced by a single dimensional loop. At block 512, for each iteration of the multi-dimensional array, ELI utility 120 "dequeues" an entry from the queue to use the entry to access the array upon which ELI utility 120 iterates. At block 514, ELI utility 120 performs (concurrent) iterations to traverse the array by using the respective queue entries. The process ends at block 516.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a multiple processor computer system is having a plurality of processors, a computer-implemented method comprising:

in response to detecting initiation of a target program, pre-assigning a speculative iterator thread to a dedicated processor from among the plurality of processors;

during the execution period of the program, initiating the speculative iterator thread at a start of a basic code block ahead of execution of a code block for a nested loop;

pre-computing, via the speculative iterator thread, a plurality of indices for a multidimensional array that is associated with the nested loop;

inserting the pre-computed plurality of indices as a plurality of entries within a queue; initiating iteration of the multi-dimensional array associated with the code block for the nested loop;

performing iterations on the multi-dimensional array, in response to completing iterations to obtain array indices for the region;

dequeueing an entry from the plurality of entries of the queue;

utilizing the dequeued entry, accessing an array on which the iteration is initiated utilizing; and performing concurrent iterations on the array by using the plurality of entries of the queue.

2. The method of claim 1, wherein the initiating the speculative iterator thread further comprises:

monitoring, via the speculative iterator thread, values of a Boolean flag for a value that indicates that an empty slot has been identified within the queue; and in response to detecting that the value of the Boolean flag indicates that an empty slot has been identified within the queue, pre-computing indices for the multi-dimensional array to enter into the queue;

wherein the indices represent values that are applied to an iteration to traverse the multi-dimensional array.

3. The method of claim 2, further comprising:

defining a region corresponding to a set of points of the multi-dimensional array;

configuring a size of successive steps to span dimensions of the region; and iterating via one or more co-routines through points in the region, according to the size of successive steps.

4. The method of claim 3, further comprising:

in response to receiving the Boolean flag containing the value which indicates an empty slot in the queue has been identified, selectively providing program control to a specified co-routine of the one or more co-routines, wherein the program control selectively provides results in the execution of an iteration to obtain indices for the multi-dimensional array corresponding to a point in the region; and following execution of the iteration, obtaining a set of indices;

wherein the indices represent a data point.

5. The method of claim 2, wherein the monitoring further comprises:

in response to the value of the Boolean flag being "TRUE":

reading a proxy iterator object that is used to obtain one or more iteration indices; and generating the one or more iteration indices.

6. A data processing system comprising:
a plurality of processors; and
a memory coupled to one or more of the plurality of processor and having stored therein a utility which when executed by the processor enables the data processing system to:
in response to detecting initiation of a target program, pre-assign a speculative iterator thread to a dedicated processor from among the plurality of processors in the data processing system;
during the execution period of the program, initiate the speculative iterator thread at a start of a basic code block ahead of execution of a code block for a nested loop;
pre-compute via the speculative iterator thread, a plurality of indices for a multidimensional array that is associated with the nested loop;
insert the pre-computed plurality of indices as a plurality of entries within a queue; initiate iteration of the multi-dimensional array associated with the code block for the nested loop;
the utility further comprising functions that when executed enable the data processing system to perform iterations on the multi-dimensional array in response to completing iterations to obtain array indices for the region;
dequeue an entry from the plurality of entries of the queue;
utilizing the dequeued entry, accessing an array on which the iteration is initiated; and
perform concurrent iterations on the array by using the plurality of entries of the queue.

7. The data processing system of claim 6, wherein initiating the iterator thread further comprises:
monitor, via the speculative iterator thread, values of a Boolean flag for a value that indicates that an empty slot has been identified within the queue; and
in response to detecting that the value of the Boolean flag indicates that an empty slot has been identified within the queue, pre-compute indices for the multi-dimensional array to enter into the queue;
wherein the indices represent values that are applied to an iteration to traverse the multi-dimensional array.

8. The data processing system of claim 7, the utility further comprising functions that when executed enable the data processing system to:
define a region corresponding to a set of points of the multi-dimensional array;
configure a size of successive steps to span dimensions of the region; and
iterate, via one or more co-routines through points in the region, according to the size of successive steps.

9. The data processing system of claim 8, the utility further comprising functions that when executed enable the data processing system to:
in response to receiving the Boolean flag containing the value which indicates an empty slot in the queue has been identified, selectively provide program control to a specified co-routine of the one or more co-routines, wherein the program control selectively provides results in the execution of an iteration to obtain indices for the multi-dimensional array corresponding to a point in the region; and
following execution of the iteration, obtain a set of indices; wherein the indices represent a data point.

10. The data processing system of claim 7, wherein the functions for monitoring further comprises functions that when executed enable the data processing system to:
in response to the value of the Boolean flag being "TRUE":
read a proxy iterator object that is used to obtain one or more iteration indices; and
generate the one or more iteration indices.

11. A computer program product comprising:
a non-transitory computer readable storage medium; and
program code on the non-transitory computer readable storage medium that when executed within a data processing device, the program code provides the functionality of:
in response to detecting initiation of a target program, pre-assigning a speculative iterator thread to a dedicated processor from among a plurality of processors;
during the execution period of the program, initiating the speculative iterator thread at a start of a basic code block ahead of execution of a code block for a nested loop;
pre-computing, via the speculative iterator thread, a plurality of indices for a multidimensional array that is associated with the nested loop;
inserting the pre-computed plurality of indices as a plurality of entries within a queue; initiating iteration of the multi-dimensional array associated with the code block for the nested loop;
in response to completing iterations to obtain array indices for the region, performing iterations on the multi-dimensional array;
dequeueing an entry from the plurality of entries of the queue;
utilizing the dequeued entry, accessing an array on which the iteration is initiated utilizing; and
performing concurrent iterations on the array by using the plurality of entries of the queue.

12. The computer program product of claim 11, the program code for initiating the speculative iterator thread further comprising program code for:
monitoring, via the speculative iterator thread, values of a Boolean flag for a value that indicates that an empty slot has been identified within the queue; and
in response to detecting that the value of the Boolean flag indicates that an empty slot has been identified within the queue, pre-computing indices for the multi-dimensional array to enter into the queue;
wherein the indices represent values that are applied to an iteration to traverse the multi-dimensional array.

13. The computer program product of claim 12, further comprising program code for:
defining a region corresponding to a set of points of the multi-dimensional array;
configuring a size of successive steps to span dimensions of the region; and
iterating via one or more co-routines through points in the region, according to the size of successive steps.

14. The computer program product of claim 13, further comprising program code for:
in response to receiving the Boolean flag containing the value which indicates an empty slot in the queue has been identified, selectively providing program control to a specified co-routine of the one or more co-routines, wherein the program control selectively provides results in the execution of an iteration to obtain indices for the multi-dimensional array corresponding to a point in the region; and
following execution of the iteration, obtaining a set of indices;
wherein the indices represent a data point.

15. The computer program product of claim 12, wherein the program code for monitoring further comprises program code for:

in response to the value of the Boolean flag being "TRUE":
   reading a proxy iterator object that is used to obtain one or more iteration indices; and
   generating the one or more iteration indices.

* * * * *